United States Patent
Nauerz et al.

(10) Patent No.: US 9,514,553 B2
(45) Date of Patent: Dec. 6, 2016

(54) PERSONALIZED CONTENT LAYOUT

(75) Inventors: Andreas Nauerz, Boeblingen (DE);
Stephan Laertz, Boeblingen (DE);
Richard Jacob, Boeblingen (DE);
Timo Kussmaul, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1160 days.

(21) Appl. No.: 13/236,906

(22) Filed: Sep. 20, 2011

(65) Prior Publication Data

US 2012/0079400 A1 Mar. 29, 2012

(30) Foreign Application Priority Data

Sep. 29, 2010 (EP) .................................. EP10182279

(51) Int. Cl.
| | |
|---|---|
| *G06F 3/0481* | (2013.01) |
| *G06T 11/20* | (2006.01) |
| *G06F 17/30* | (2006.01) |
| *G06F 17/21* | (2006.01) |

(52) U.S. Cl.
CPC ........... *G06T 11/206* (2013.01); *G06F 3/0481* (2013.01); *G06F 17/211* (2013.01); *G06F 17/3089* (2013.01); *G06F 17/30705* (2013.01)

(58) Field of Classification Search
CPC .. G06F 17/212; G06F 17/211; G06F 17/3089; G06F 17/30905; G06F 3/0481; G06F 3/125; G06K 9/00463; H04L 67/22; H04L 43/08; H04L 67/2823
See application file for complete search history.

(56) References Cited

U.S. PATENT DOCUMENTS

| | | | |
|---|---|---|---|
| 6,934,697 B1 | 8/2005 | Warren | |
| 7,330,890 B1 * | 2/2008 | Partovi et al. | ................ 709/224 |
| 7,409,335 B1 * | 8/2008 | Horvitz | ............. G06F 17/30705 |
| | | | 704/9 |

(Continued)

FOREIGN PATENT DOCUMENTS

| | | |
|---|---|---|
| CN | 1239253 A | 12/1999 |
| CN | 101304224 A | 12/2009 |

(Continued)

OTHER PUBLICATIONS

Office Action in related Chinese patent application No. 201110303720.1, mailed on Apr. 30, 2014; 7 pages.

*Primary Examiner* — Ryan Pitaro
(74) *Attorney, Agent, or Firm* — Schmeiser, Olsen & Watts LLP (57) ABSTRACT

A method for creating a personalized content layout for a user interface is provided. The method may comprise providing a content layout framework, monitoring and storing usage data over time of a content fragment, displayed in the content layout framework, promoting or demoting the content fragment in respect to its presentation within the content layout framework based on a first value of a first parameter of the parameter model, wherein the promotion or demotion uses an abrasion factor, such that a content fragment appearance degrades or increases from session to session of usage of the content layout framework depending on a predefined function deployed to the first value of the first parameter of the parameter model.

25 Claims, 8 Drawing Sheets

(56) References Cited

U.S. PATENT DOCUMENTS

| | | | |
|---|---|---|---|
| 8,533,044 B2* | 9/2013 | Oren | G06Q 30/02 705/14.41 |
| 2002/0144233 A1* | 10/2002 | Chong et al. | 717/105 |
| 2003/0046316 A1* | 3/2003 | Gergic et al. | 707/513 |
| 2003/0110161 A1* | 6/2003 | Schneider | 707/3 |
| 2004/0268228 A1* | 12/2004 | Croney et al. | 715/505 |
| 2005/0240875 A1* | 10/2005 | Takayama et al. | 715/745 |
| 2005/0267869 A1* | 12/2005 | Horvitz et al. | 707/2 |
| 2006/0015846 A1* | 1/2006 | Fraleigh et al. | 717/109 |
| 2007/0038601 A1* | 2/2007 | Guha | G06F 17/30867 |
| 2007/0038616 A1* | 2/2007 | Guha | G06F 17/30672 |
| 2007/0198663 A1* | 8/2007 | Helander | H04L 41/0806 709/220 |
| 2007/0300185 A1 | 12/2007 | Macbeth | |
| 2008/0005679 A1* | 1/2008 | Rimas-Ribikauskas | G01C 21/3688 715/745 |
| 2008/0052639 A1* | 2/2008 | Chun et al. | 715/810 |
| 2008/0092057 A1* | 4/2008 | Monson et al. | 715/744 |
| 2008/0114753 A1* | 5/2008 | Tal-Ezer | 707/5 |
| 2008/0201242 A1* | 8/2008 | Minnis et al. | 705/27 |
| 2009/0276764 A1* | 11/2009 | Ghorbani et al. | 717/148 |
| 2010/0036933 A1* | 2/2010 | Breau et al. | 709/218 |
| 2010/0037187 A1* | 2/2010 | Kondziela | G06F 3/011 715/866 |
| 2011/0107233 A1* | 5/2011 | Buehler et al. | 715/747 |
| 2011/0131479 A1* | 6/2011 | Padgett et al. | 715/223 |
| 2012/0054022 A1* | 3/2012 | Kosashvili | 705/14.43 |
| 2012/0054611 A1* | 3/2012 | Perrodin | G11B 27/34 715/716 |
| 2012/0178529 A1* | 7/2012 | Collard | A63F 13/06 463/31 |
| 2012/0296909 A1* | 11/2012 | Cao | G06F 17/30867 707/737 |
| 2013/0036351 A1* | 2/2013 | King et al. | 715/234 |
| 2013/0091409 A1* | 4/2013 | Jeffery | 715/202 |
| 2014/0033007 A1* | 1/2014 | Mhatre | 715/205 |
| 2015/0039996 A1* | 2/2015 | Kwon | 715/234 |
| 2015/0347488 A1* | 12/2015 | Peters | G06F 3/04817 715/765 |

FOREIGN PATENT DOCUMENTS

| | | |
|---|---|---|
| JP | H02-114318 A | 4/1990 |
| JP | 2003-281604 A | 10/2003 |
| JP | 2004-347634 A | 12/2004 |
| JP | 2005-062978 A | 3/2005 |
| JP | 2006-092269 A | 4/2006 |
| JP | 2008-183423 A | 8/2008 |
| JP | 2008-305029 A | 12/2008 |

* cited by examiner

| Family Name | Given Name | Company | Phone |
|---|---|---|---|
| Alan | Ben | IBM | +1234 |
| Brown | Charles | IBM | +4567 |
| Charlston | Donald | - | +9012 |
| Douglas | Ernie | IBM | +3456 |
| Ernesto | Brain | - | +7890 |
| Francis | Drake | IBM | +1225 |
| Gregory | Paul | IBM | +3878 |

| Family Name | Given Name | Company | Phone |
|---|---|---|---|
| Alan | Ben | IBM | +1234 |
| Brown | Charles | IBM | +4567 |
| Charlston | Donald | - | +9012 |
| Douglas | Ernie | IBM | +3456 |
| Ernesto | Brain | - | +7890 |
| Francis | Drake | IBM | +1225 |
| Gregory | Paul | IBM | +3878 |

PERSONALIZED CONTENT LAYOUT

RELATED APPLICATION

This application is a utility application claiming priority to co-pending German Patent Application No. EP10182279, filed Sep. 29, 2010 entitled "SYSTEM AND METHOD FOR PERSONALIZED CONTENT LAYOUT," the entirety of which is incorporated by reference herein.

FIELD OF THE INVENTION

The invention relates generally to a method for creating a personalized content layout for a user interface as well as to a graphical interaction system. The invention relates further to a computer system, a data processing program, and a computer program product.

BACKGROUND OF THE INVENTION

Today, information or accessible resources like programs or services are often organized using Web technologies like portals and hyperlinks. Typically, portals use templates for displaying information of other functions like sub-program calls. The available functions, programs and information are displayed at specific fields or places within the template.

When (Web) applications are visited by users in a portal, the applications are usually presented in a similar fashion to all users accessing them. But of course, not every user is interested in the same content or the same services, and hence, the overall structure/layout may satisfy the needs of one user more than others.

Personalized application user interfaces take single users interests and preferences into consideration. Based on various metrics, such as user profile data, user interaction behavior, and so on, user models may be derived that reflect interests and preferences.

Additionally, contextual data, like current location, current date or time of access, may be taken into consideration as interests usually vary in different situations. User and context model data can finally be leveraged to realize a personalized adaptive user interface wherein the user interface presents information fragments or application being of interest and where information fragments or applications being of little interest will not be displayed or less prominent.

For example, in an e-learning system, a historic behavior of a user could be used to visualize the user what has not yet been learned. In such scenarios, lections or units not yet accessed and thus not learnt may be presented while those, already finished, may not be presented in the portal.

SUMMARY

According to one embodiment, an aspect of the invention relates to a method for creating a personalized content layout for a user interface is provided. The method comprises: providing a content layout framework, monitoring and storing usage data over time of a content fragment, displayed in the content layout framework using a parameter model, and changing a visual appearance of the content fragment in respect to its presentation within the content layout framework based on a first value of a first parameter of the parameter model, wherein the change to the visual appearance of the content fragment may use an abrasion factor, such that a content fragment appearance may change from session to session of usage of the content layout framework depending on a predefined function deployed to the first value of the first parameter of the parameter model.

According to another embodiment, an aspect of the invention relates to a computer program product for creating a personalized content layout for a user interface. The computer program product comprises a computer-readable persistent storage medium having computer readable program code embodied therewith. The computer readable program code comprises computer readable program code configured to provide a content layout framework, to monitor and store usage data over time of a content fragment, displayed in the content layout framework using a parameter model, and to change a visual appearance of the content fragment in respect to its presentation within the content layout framework based on a first value of a first parameter of the parameter model. Wherein the computer readable program code that is configured to change the visual appearance of the content fragment uses an abrasion factor, such that a content fragment appearance changes from session to session of usage of the content layout framework, depending on a predefined function, deployed to the first value of the first parameter of the parameter model.

According to another embodiment, an aspect of the invention relates to an apparatus comprising memory storing computer-readable program code, and a processor in communication with the memory to access the computer-readable program code. The processor executes the computer-readable program code to provide a content layout framework, monitor and store in the memory usage data over time of a content fragment displayed in the content layout framework using a parameter model, and change a visual appearance of the content fragment in respect to its presentation within the content layout framework based on a first value of a first parameter of the parameter model. Wherein the processor uses an abrasion factor to determine the change of the visual appearance, such that a content fragment appearance changes from session to session of usage of the content layout framework depending on a predefined function deployed to the first value of the first parameter of the parameter model.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The promotion or demotion of content fragments may comprise an adaptation of color, font, font size, saturation or de-saturation, blinking effects accompanying sound effects, spacing effects between letters of terms representing the content fragments. In particular, the promotion and demotion comprises clearly more than just a simple on/off of a content fragment. Additionally, the promotion and demotion may have a clear direction from session to session, e.g., degrading/decreasing or increasing/intensifying, such that there may be a visible linkage between appearances of content fragments between sessions, if the same device in the same context, the same time and the same location may be used. Thus, the promotion or demotion is not only dependent on one simple value of a parameter, but may be dependent from a whole range of different values of the parameter model.

In the context of this application the following expression conventions have been followed:

Content layout framework—A content layout framework may denote an abstract framework, e.g., in a portal with access to information or applications via Internet mechanisms. An alternative term may be a display template. Each displayed component may have a default location in the template or framework. In particular, a content layout framework may be personalized. This means that icons and locations thereof in the template may be different from user to user. Also, more than one template may be used during a session. While the framework for the same device may have an identical appearance for a larger group of users, a display of icons or content fragments may be individualized, e.g., based on an historic behavior or usage by a user.

Content fragment—A content fragment may denote an icon displayed within the content layout framework or display template. It may give a user access to resources available in a computer network like the Internet or an internal enterprise network. That may include access to applications, information like text documents, hyperlinks to other documents, pictures, videos, music and any mixture thereof. Basically, content fragment may denote anything that is displayable in a template of a portal of a computer system, smartphone or the like.

Behavior pattern—A behavior pattern typically stored in a pattern model as usage values may denote a history of content fragments used. When was it used, from which device was it used, how often was it used, etc? Other parameters may also be used as part of the behavior or parameter model.

Session—A session may denote a communication session, i.e., a semi-permanent interactive information exchange between communicating devices that is established at a certain time and torn down at a later time. A Web or HTTP session involves typically a Web and/or portal server.

Promoting a content fragment—The terms 'promoting' may denote a raise of attention achieved by visual effects. Such visual effect may include larger fonts, colors, background colors, blinking effects, size, spacing between letters, font size of different letters, accompanying sound effects, movie-like changes of the representing icon and other visual elements that highlight a term or content fragment on a computer screen. Consequently, a demotion may denote decreasing the visual appearance of a content fragment.

Abrasion factor—An abrasion factor may denote a factor influencing an appearance of a key word, a content fragment or other displayable icons in a portal. If, e.g., the abrasion factor may be "1", the content fragment to be displayed may be displayed without any additional effects. If the factor may be below "1", the content fragment to be displayed may be demoted, meaning that the content fragment may be displayed suboptimal. If the factor may be above "1", the content fragment to be displayed may be displayed more predominant for a better visibility and recognizability.

The above-described method for interactive visualization of an user interest model via an interactive graphical user interface and the associated graphical interaction system may offer some advantages. One of the advantages may be in a personalized user interface. Depending on the abrasion factor, specific content fragments may be displayed either better or less good visible. That may be achieved by, e.g., optical whitening a content fragment to be displayed from session to session if a user does not make use of the content fragment. If, however, a monitoring of the usage of a content fragment may show that it may have been used more often than other content fragments, then its visibility may be increased. This may be done by a display characteristic based on color, font, font size, saturation, background color, blinking, frequency of blinking, color change of individual letters, etc., as already mentioned above. However, it should be highlighted that the mechanism of an abrasion factor may lead to a much higher flexibility in the design of an individual or personalized user interface than a simple turning on or off, i.e., displaying or not displaying of a content fragment in a portal.

Additionally, the parameter model may be filled with values by other traditional applications, and the values of the parameter model may also be transmitted to other traditional applications triggering specific functions in those applications.

In on embodiment of the method, the predetermined function may be a linear function depending on the devolution of the first values of the first parameter of the parameter model. This may have the consequence that over time, a content fragment may disappear over time from the content layout framework, i.e., it may not be displayed any longer. However, this is not an abrupt process. If usage parameters of a content fragment indicate that they may not have been used during the last sessions, the linear function of usage value may be extrapolated below a "zero line" and, thus, the corresponding content fragment may no longer be displayed as part of the content layout framework in a portal. Other function types may be used, e.g., quadratic, logarithmic, exponential, or any other types of functions.

In another embodiment of the method, a content fragment, which may have visually disappeared from the content layout framework, may appear in a framework box for invisible fragments. Another name for the framework box may be "magic box", which may be called using a pop-up function of a portal, such that the non-displayed content fragment may still be visible and not getting lost completely.

In another embodiment of the method, the content fragment that appears in the framework box may be restorable for appearing in the content layout framework. This way, hidden and no longer displayed content fragments may be recoverable or at least still visible for a user. However, it takes more effort to a user to make these content fragments visible again. A special function may also restore the content fragment as part of the content layout framework.

In an advanced embodiment of the method, a reset function may reset all values of all parameters for an equal presentation weighting of all content fragments in the content layout framework. In this case, no promoting or demoting of content fragments may be visible in the content layout framework.

In again another embodiment of the method, backup copies of the parameter model values are stored in different versions depending on predefined time intervals. This may allow to restore a parameter value setting from some time ago, e.g., from a day before, last week, last month, etc. If a user determines that the system might have misinterpreted his usage of the system, he may refer back to an older version of parameter values, resulting in a historic promotion or demotion of content fragments and continue with it.

In just another embodiment of the method, the parameter model, with respect to the content fragment, comprises at least a second parameter representing one out of the group, comprising time of usage, day in a week of usage, device used and location of usage. This allows even more flexibility of the personalization of a user interface. In particular, a series of additional parameters may be made available as part of the parameter model. Specific devices, on which the content layout framework may be displayed, may require different abrasion factors for an identical content fragment. In case of a contact list, specific names and phone numbers may be promoted or demoted differently on a smartphone compared to a stationary office computer or a portable media system, because the usage of contact names may be different if a user is traveling or in his office.

Also, the names in a contact list may be of different interest to a user during different times of a day. During normal office hours, business contacts may be more interesting, while during off-work hours private contacts may be more interesting. The same applies to the weekend days during the course of the week. Consequently, a series of parameter values of the parameter model may in a combination determine the final appearance of a contend fragment in the template.

There may also be an embodiment wherein the method comprises additionally providing a programming interface to the parameter model. This feature offers the mechanism of an abrasion factor to other applications like traditional transactional applications, e-learning applications, contact applications, social media applications, content management applications, etc.

In particular, the values of the parameter model may be influenced, e.g., filled, amended or completed. The values of the parameters of the parameter model may also be fed into the applications to trigger application functions that may otherwise have required manual intervention, like a reconfiguration or personalization of a user interface of a transactional application like, e.g., a customer relationship management application.

In again another embodiment of the method, the promotion or demotion may be calculated by an abrasion calculation component, wherein the calculation is a function of values of the parameter model and a device type that displays the content layout framework. Such an abrasion calculation component may have stored functions for a specific abrasion mechanism and it may make reference to a user model, a context model, a device model, and a content model resulting in a very high degree of personalization options.

Furthermore, a computer or computer system may comprise a graphical interaction system as just described and referring to the method for creating a personalized content layout for a user interface.

It should be noted that embodiments may take the form of an entire hardware implementation, an entire software embodiment or an embodiment containing both, hardware and software elements. In a preferred embodiment, the invention is implemented in software which includes, but is not limited to, firmware, resident software and microcode.

In one embodiment, a data processing program for execution in a data processing system is provided comprising software code portions for performing the method as described above when the program is run on a data processing system. The data processing system may be a computer or computer system.

In the following, a detailed description of the drawings will be given. All illustrations in the drawings are schematic. Firstly, a block diagram of the inventive method for creating a personalized content layout for a user interface will be described. Afterwards, embodiments of a method and appearances of embodiments of the method for creating a personalized content layout for a user interface will be described.

Figure 1:
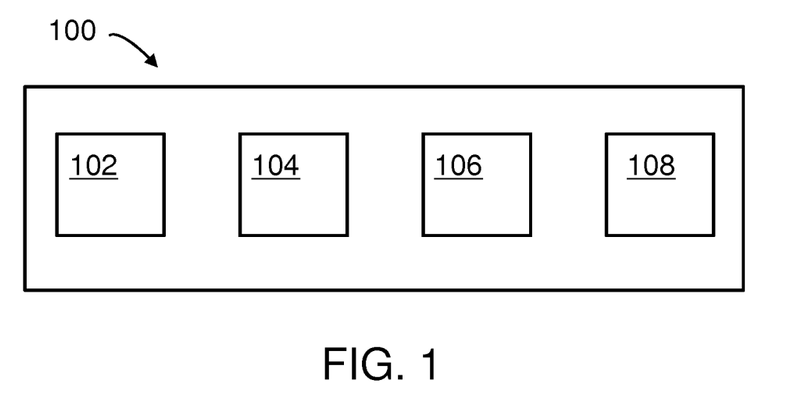
FIG. 1 shows a block diagram of the inventive method.

FIG. 1 shows a block diagram of the inventive method 100 for creating a personalized content layout for a user interface. The method may comprise providing, 102, a content layout framework, monitoring, 104, and storing, 106, usage data over time of a content fragment, displayed in the content layout framework, using a parameter model, promoting or demoting, 108, the content fragment in respect to its presentation within the content layout framework based on a first value of a first parameter of the parameter model, wherein the promotion or demotion may use an abrasion factor, such that a content fragment appearance may be increased or degraded from session to session of usage of the content layout framework depending on a predefined function deployed to first values of the first parameter of the parameter model.

Figure 2:
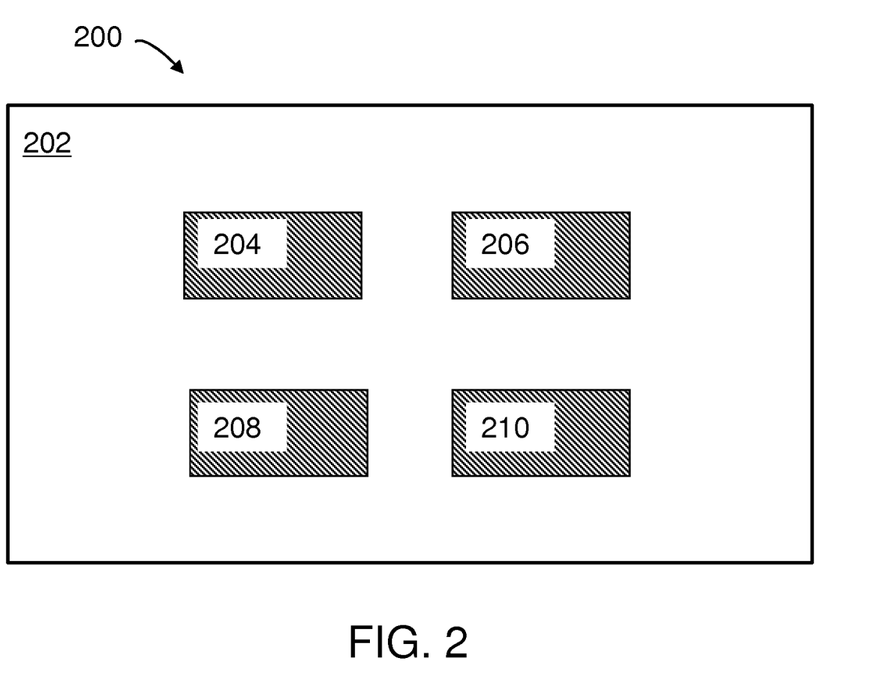
FIG. 2 shows an appearance of a template of a portal according to an embodiment of the invention.

FIG. 2 shows an appearance 200 of a template or content layout framework 202 of a portal according to one embodiment of the invention. Four fields 204, 206, 208 and 210 may be displayed. They may represent user choices for content fragments. The pattern may represent a normal display mode without any promotion/highlighting or demotion/damping of the related icon.

Figure 3:
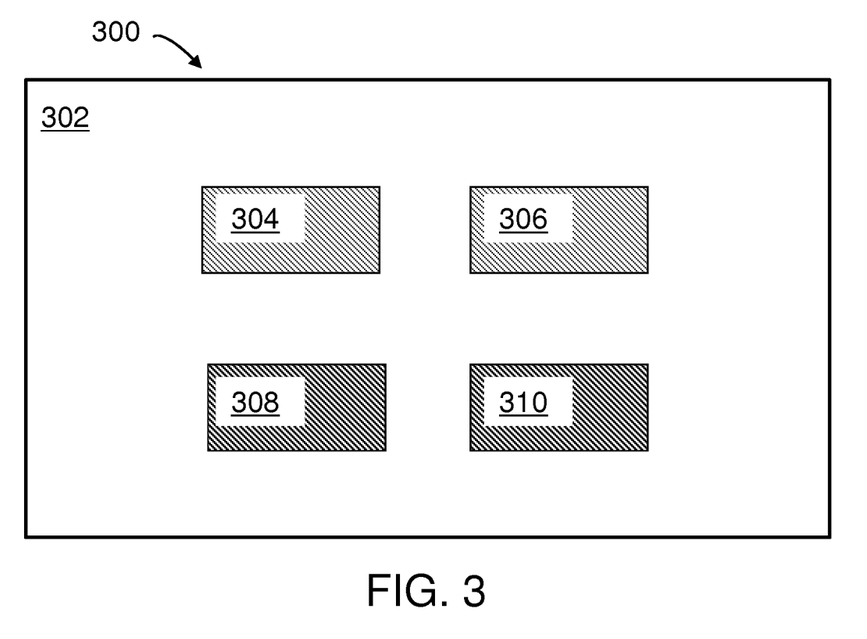
FIG. 3 shows another appearance of a template of a portal according to an embodiment of the invention.

FIG. 3 shows another appearance 300 of the same template 202, 302 of FIG. 2. However, here, the fields 304, 306, 308 and 310 have a different pattern. The fewer stripes in field 304 and 306 may indicate that an abrasion factor has been applied so that the appearance is not so bold as in the normal case of FIG. 2. The content fragments related to icons 304 and 306 may not have been used by a user during the last or several last sessions during which the template has been displayed on a display. All fields 304, 306, 308 and 310 together may, e.g., represent units in an e-learning program. In this case, the demotion of the icons 304 and 306 may denote that a user has finished these units already, while the other two units represented by icon 308 and 301, are waiting to be exercised by the user.

FIG. 4 shows again another appearance 400 of a template 402. In this case, icon 404 is almost completely washed out and only slightly visible. It may not have been used by the user for a couple of sessions. Icon 408 appears in a way as on the initial appearance 200. However, icon 410 may be intensified or promoted in its visibility. This may be achieved by a larger font size, another font, another color, in particular for each character of a term, spacing or other color effects or by different background. Blinking and other visual effects—as described above—may also be used. In case of an e-learning system, the promotion of icon 410 may denote that a user may have to do this unit next. But in another case, e.g., a contact list, the promotion of the icon 410 may mean that a user has most often used the address, telephone number or contact represented by icon 410. The other contacts represented by icon 404, 406 and 408 may have been used by the user less often. Actually, the contact represented by icon 404 may disappear during a next session because the user does not seem to be interested at all in this contact. However, the contact may continue to be part of the template 402 in a framework box. Such a framework box may be another icon on the template (not shown) that may be callable by a pop-up function, such that all disappeared icons or content fragment may be displayed and restorable as part of the template.

Figure 4:
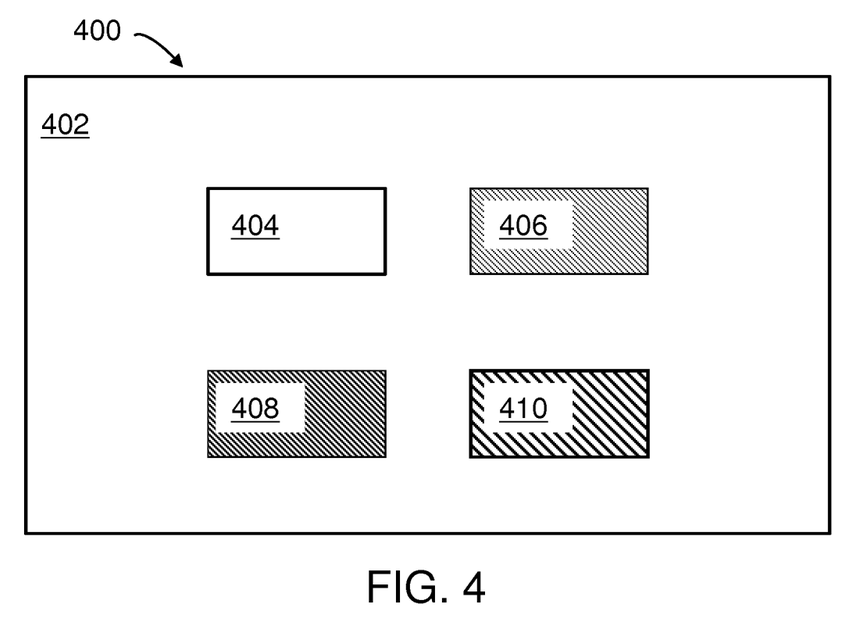
FIG. 4 shows again another appearance of a template of a portal according to an embodiment of the invention.

This shows that a promotion or demotion of a content fragment may have different meanings depending on the application context.

Figure 5:
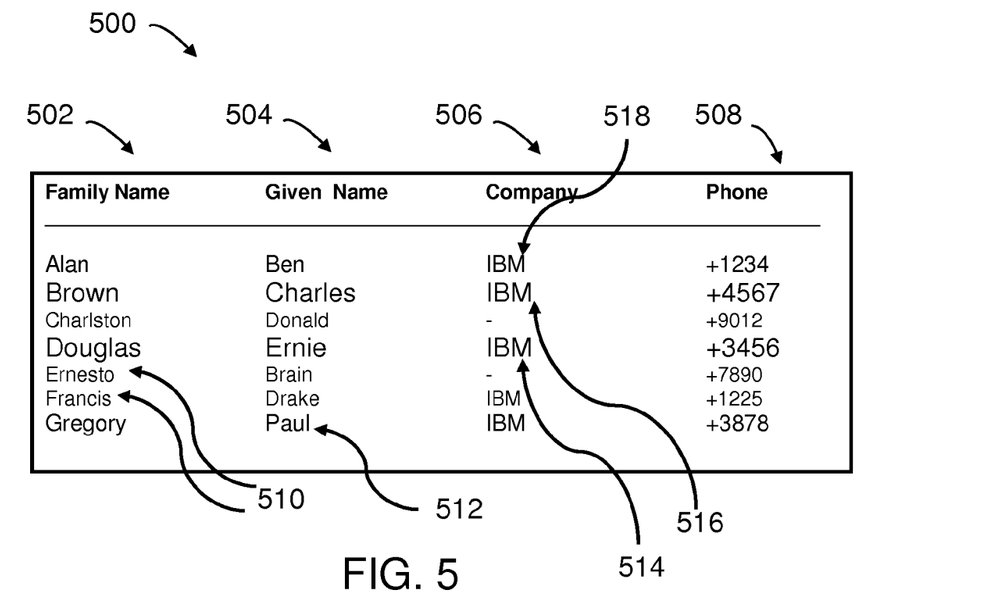
FIG. 5 shows a work-hour contact list according to an embodiment of the invention.

FIG. 5 shows a contact list 500 according to an embodiment of the invention. An abrasion factor engine may determine that a user may be at work because of the time of the day. Consequently, only those contacts are promoted that are of interest during work-hours. The list displays a family name 502, a given name 504, a company name 506, and a phone number 508 of a contact. Lines 514 and 516 may be promoted by larger fonts. But also other promotion effects—as described above—may be used. Contact list lines 512 and 518 may denote contacts that may be of average interest, while contacts 510 may be of low interest to the user at this point in time. These lines have been demoted. However, there may be different reasons for the demotion of the line 510. Either the owner of the contact list may not have used the contact for a couple of sessions and the displaying of the contacts may have been demoted, i.e., displayed with a smaller font, or these contacts 510 may not be of interest during the specific time of the day, the contact list may be used. It may represent private contacts and not business contacts.

Figure 6:
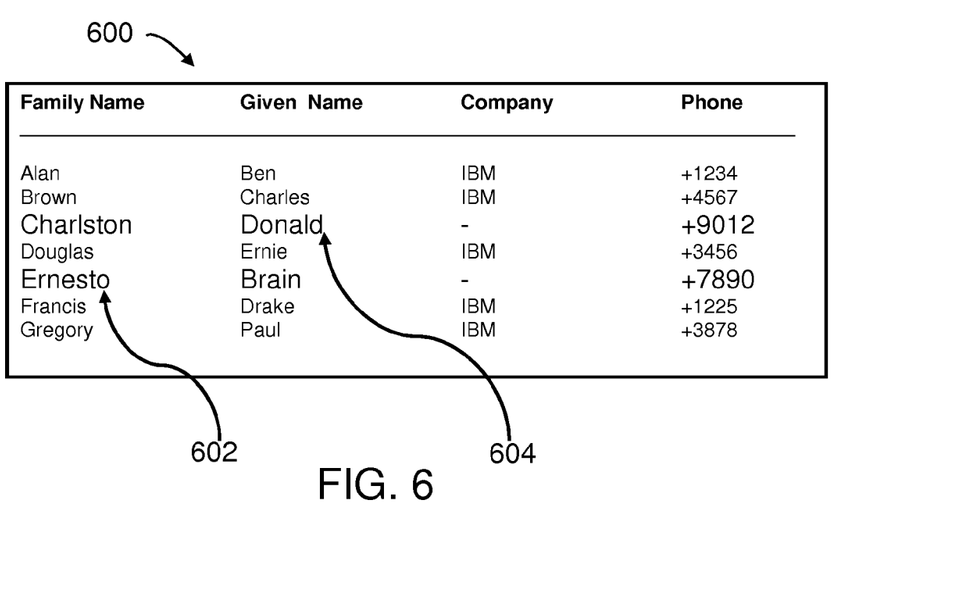
FIG. 6 shows an off-work hour contact list according to an embodiment of the invention.

FIG. 6 shows the same contact list 600 during off-work hours. In this case, contacts 602 and 604 have been promoted and the other names in the contact list have been demoted. In this case, the abrasion calculation component may have determined that during off-work hours the work contact may not be at all, or of less interest to the user.

The following parameter model or data model of table 1 may be useful. Per line it may have the fields contentID (ID=identification), userID, deviceID, contextID, content title and utilization. The contentID may be a simple numerical key; the userID may denote the user for whom the information is collected by a usage tracking component; the deviceID may be an identifier for a device from which a content fragment may have been called; the contextID may denote circumstances like time or day of the week, etc.

TABLE 1

| ContentID | UserID | DeviceID | ContextID | Content title | Utilization (clicks) |
|---|---|---|---|---|---|
| 0 | andreas | 1 | 1 | Allan, Ben | 12 |
| 1 | andreas | 1 | 2 | Allan, Ben | 3 |
| 2 | andreas | 2 | 3 | Allan, Ben | 8 |
| 3 | andreas | 1 | 1 | Ernesto, Brain | 2 |
| 4 | andreas | 1 | 2 | Ernesto, Brain | 11 |
| 5 | andreas | 2 | 3 | Ernesto, Brain | 7 |

TABLE 1-continued

| ContentID | UserID | DeviceID | ContextID | Content title | Utilization (clicks) |
|---|---|---|---|---|---|
| 6 | andreas | 1 | 1 | Gregory, Paul | 9 |
| 7 | andreas | 1 | 2 | Gregory, Paul | 4 |
| ... | ... | ... | ... | ... | ... |

Specific values may also be stored in another table for different users, identifiable by the userID.

Further information regarding the deviceID may be stored in the following way:

TABLE 2

| DeviceID | Type | OS | Screen size | Color depth | ... |
|---|---|---|---|---|---|
| 1 | desktop | WIN 7 | 800 × 600 | 16Mio. | |
| 2 | mobile | iPhone | 480 × 240 | 65k | |
| ... | | | | | |

In this embodiment, a device number, a device type, an operating system (OS) a screen size and a color depth may be stored. Other device info may also be stored, e.g., a browser type and version. In the above case, two types of devices may be described: a desktop device and a mobile device with different characteristics as can be seen in table 2.

Moreover, also the context may be described in a similar fashion.

TABLE 3

| ContextID | Title | IP | Day of week | Time | ... |
|---|---|---|---|---|---|
| 1 | work | 9.16.21.17 | Mon-Fri | 8 am-6 pm | |
| 2 | private | 167.12.31.3 | Mon-Sun | 6 pm-10 pm | |
| 3 | traveling | 89.21.2.3 | Mon-Fri | 8 am-6 pm | |
| ... | | | | | |

Additionally, beside the context, an information title, an IP address, day of week, time, and other parameters like GPS coordinates may also be listed. All of these parameter values are collected by the usage tracking component for every click a user does on an icon or content fragment on a display in a template of a portal. Thus, a complete "click-history" including environmental parameter values is available for an abrasion calculation component.

Figure 7:
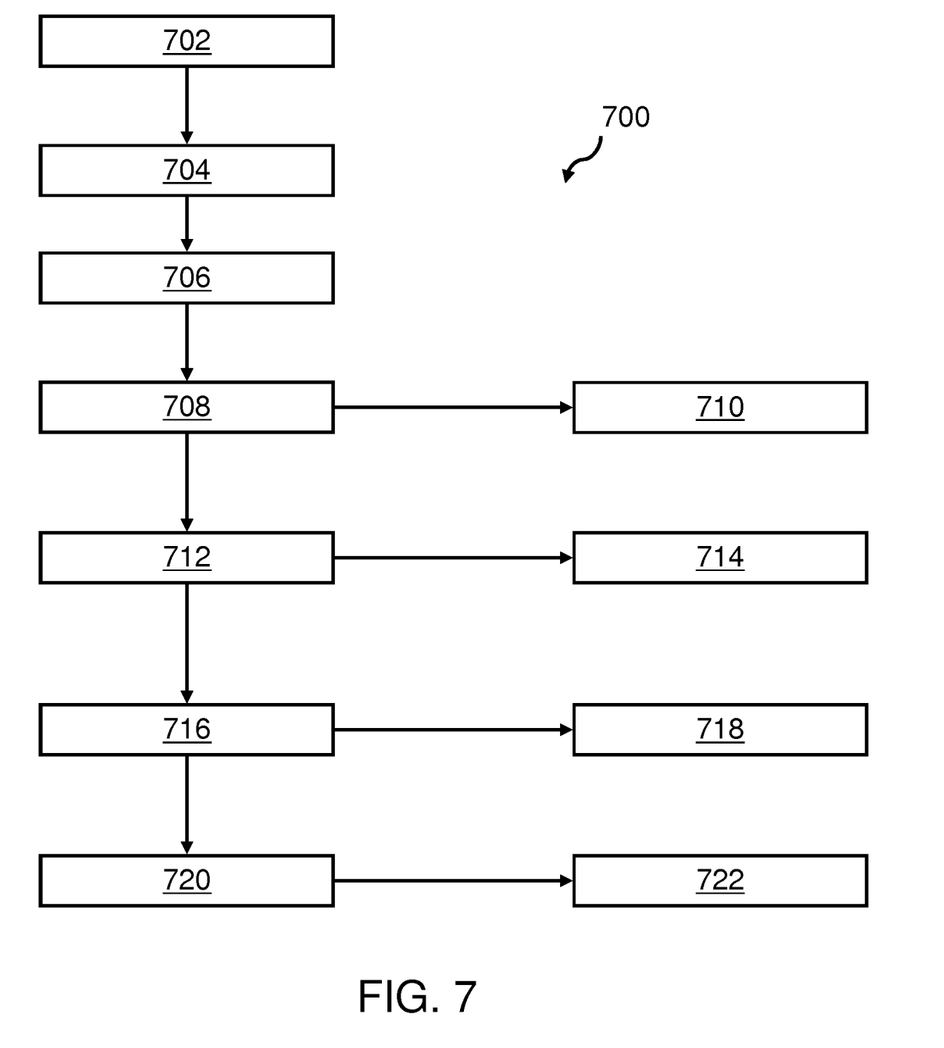
FIG. 7 shows a flow chart illustration of an embodiment of the invention.

FIG. 7 illustrates a flow chart illustration of an embodiment of the invention, in particular, the feeding of the parameter model with values. A user may interact, 702, with a system within a content layout framework. The system may be any kind of computer system. The user may click on an icon, representing a resource like a content fragment, accessible from the system, 704. The system may access an API (application programming interface) layer to inform a usage tracking component about recent events/clicks, 706. The system may transmit user data in order to allow the application logic to recognize the user who triggered the event, 708. The application logic may then determine the user (users may be assumed to be logged-in) or it may create a new user profile, 710. In step 712, the system may transmit device data in order to allow the application logic to recognize the system on which the event occurred to be detected. Then, the application logic may determine a device or it may create a new device profile in the parameter model by storing important information about the device in its database (e.g. screen size), 714. The system may then transmit context data in order to allow the context, in which the event occurred, to be detected, 716. The application logic may then determine a best matching context profile or may create a new profile, 718. Finally, the system may transmit information about with which resource the interaction may have been done, 720. If the application logic may not recognize the resource, a new entry for a resource may be created, 722.

Figure 8:
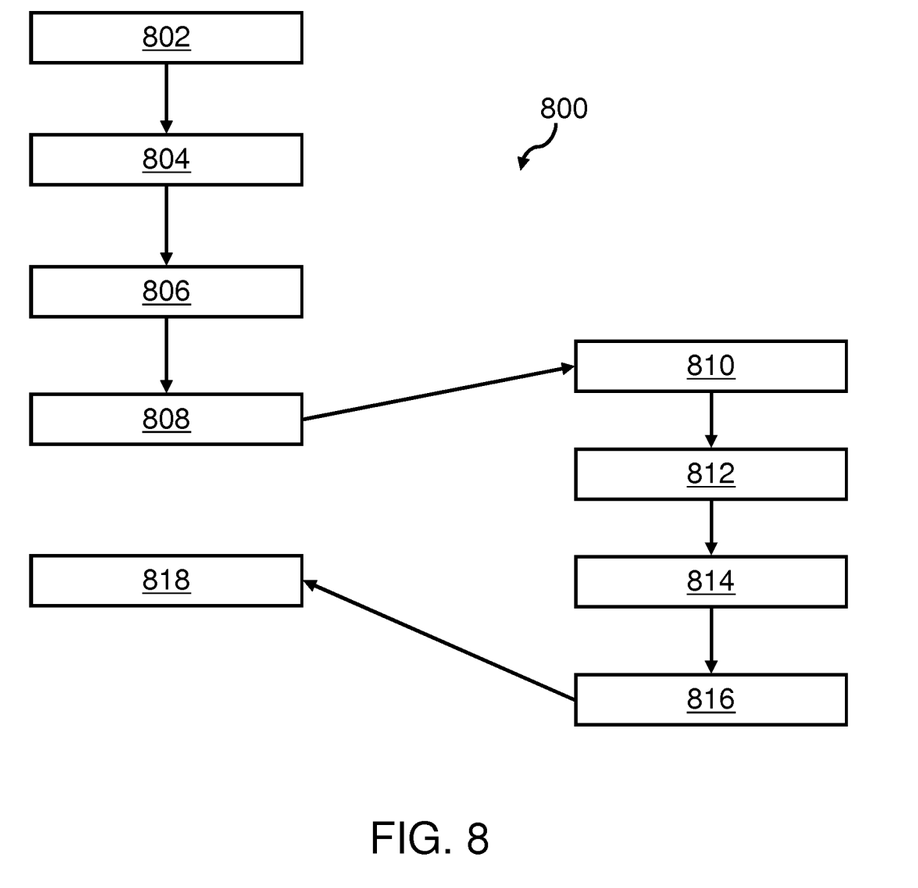
FIG. 8 shows another flow chart illustration of another embodiment of the invention.

FIG. 8 illustrates another flow chart 800 of another embodiment of the invention, in particular, the querying of the parameter model. The user may interact with a system A, whereas system A may be any system out of a set of computer systems, 802. The system A collects a list of resources (e.g. contacts) to be displayed, 804. The system A may access an API layer to inform the application logic about the resources (as well as user, device and context) to be displayed, 806. Then, the application logic may invoke the abrasion calculation component to determine an abrasion factor for each resource/icon/content fragment to be displayed, 808. For performing the abrasion, the abrasion calculation component may determine a user, 810. Additionally, the abrasion calculation component may determine a device, 812. It may also determine the context, 814, as well as it may calculate an abrasion factor (numeric value) for each resource to be displayed, 816. Finally, the system may display each single resource or content fragment according to the determined abrasion factor, 818.

In order to allow an interaction with other applications, like contact list applications, customer relationship management systems, e-learning systems, electronic content management systems and the like, specific components may need to be available.

Figure 9:
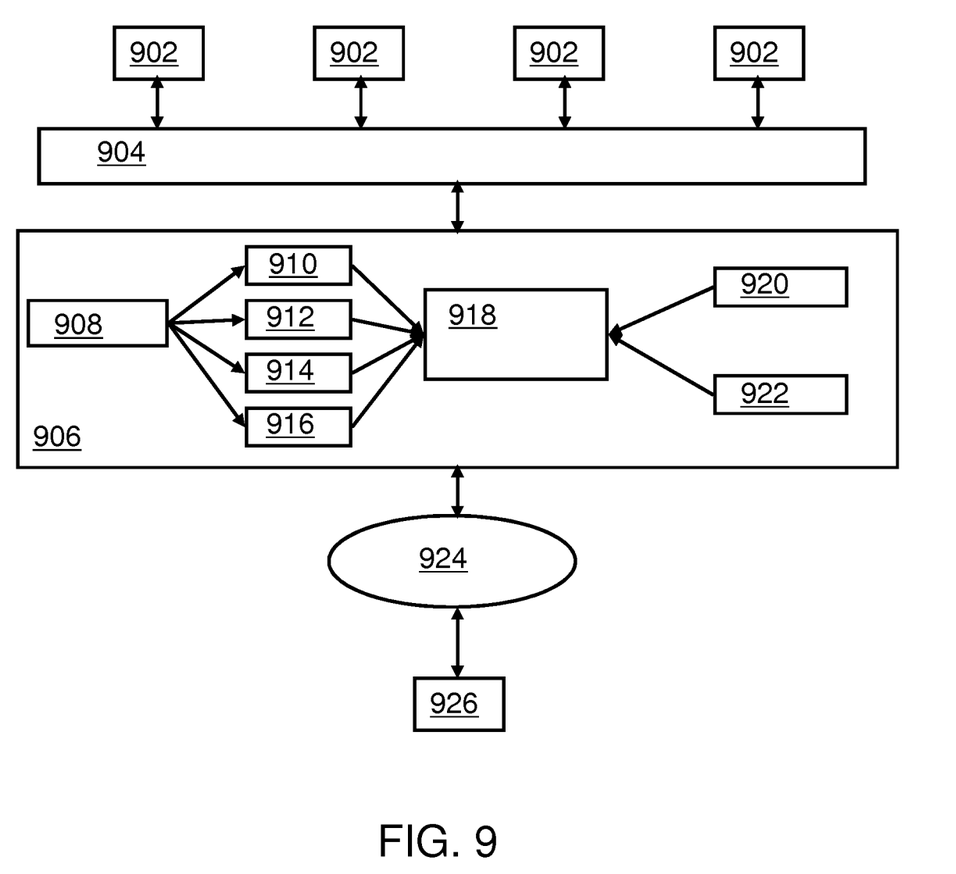
FIG. 9 shows an embodiment of the invention including a portal engine including an abrasion calculation component.

FIG. 9 shows components of a graphical interaction system and its main connections according to an embodiment of the invention. Only the relevant components are illustrated. A user may use a network attached device 926. It may be connected via the Internet or a private network 924 to a portal engine 906. The portal engine may comprise a usage tracking component 908 and an abrasion calculation component 918. The parameter model is illustrated in the parts: user model 910, context model 912, device model 914 and content model 916 as they have been described above in the context of FIG. 6. Additionally, the abrasion calculation component may access specific abrasion mechanisms 920, e.g., a linear model, and/or predefined abrasion coefficients 922.

Moreover, an API 904 to the portal engine with the specifics as just described, allow a parameter value exchange with other applications 902. This way a much more intuitive, individual and personalized user interface for any application may be realized.

Figure 10:
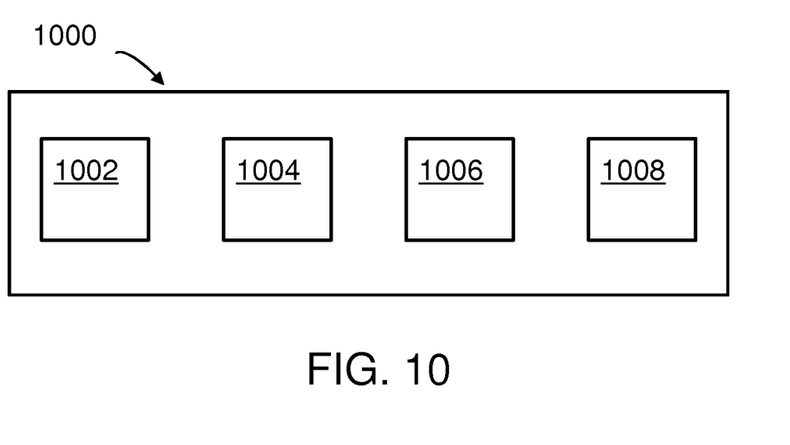
FIG. 10 shows a graphical interaction system according to an embodiment of the invention.

FIG. 10 shows a graphical interaction system 1000 according to an embodiment of the invention. The graphical interaction system 1000 may comprise a display unit 1002 for displaying a personalized content layout for a user interface. The system may also comprise a providing unit 1004 adapted for providing a content layout framework, a monitoring and storing unit 1006 adapted for monitoring and storing usage data over time of a content fragment, displayed in the content layout framework, using a parameter model, and a promotion or demotion unit 1008 adapted for promoting or demoting the content fragment in respect to its presentation within the content layout framework, based on a first value of a first parameter of the parameter model, wherein the promotion or demotion unit is adapted for a usage of an abrasion factor, such that a content fragment appearance increases or degrades from session to session of usage of the content layout framework depending on a predefined function, deployed to first values of the first parameter of the parameter model.

Figure 11:
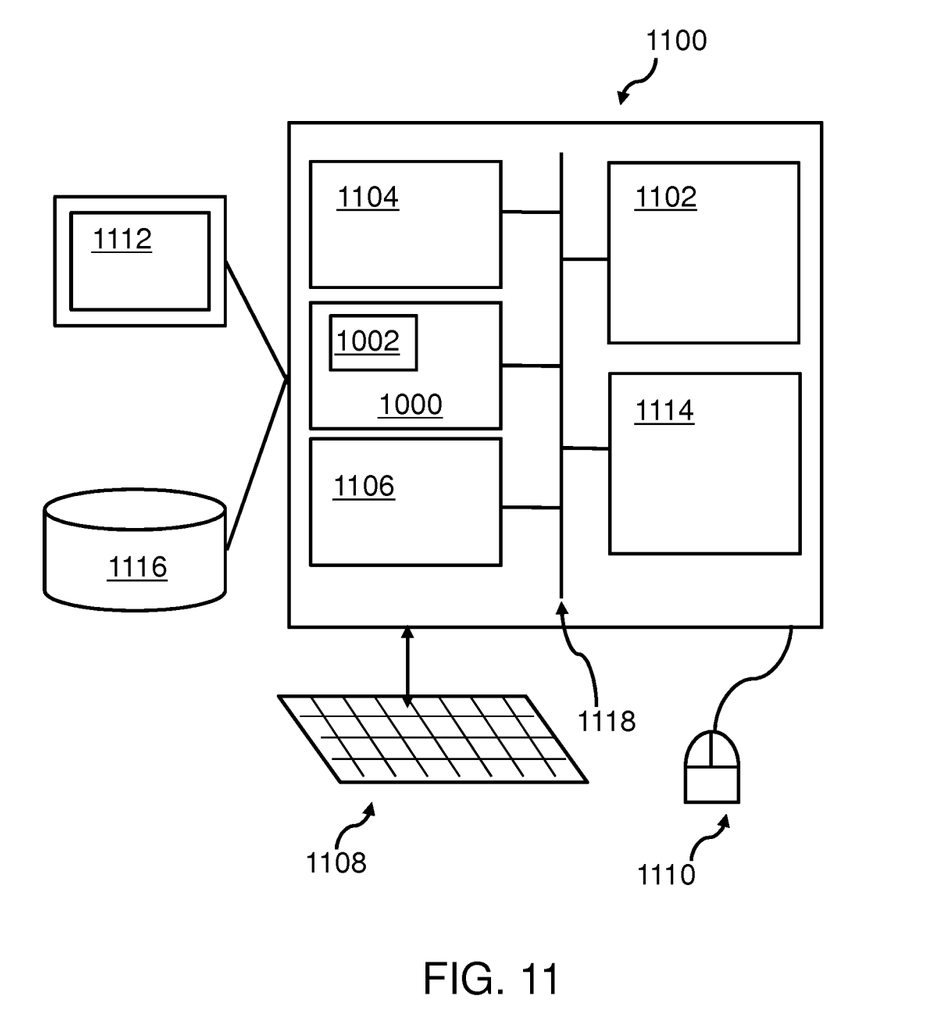
FIG. 11 shows a computer system with an integrated graphical interaction system according to an embodiment of the invention.

Embodiments of the invention may be implemented on virtually any type of computer, regardless of the platform being used suitable for storing and/or executing program code. For example, as shown in FIG. 11, a computer system 1100 may include one or more processor(s) 1102 with one or more cores per processor, associated memory elements 1104, an internal storage device 1106 (e.g., a hard disk, an optical drive such as a compact disk drive or digital video disk (DVD) drive, a flash memory stick, etc.), and numerous other elements and functionalities typical of today's computers (not shown). The memory elements 1104 may include a main memory, employed during actual execution of the program code, and a cache memory, which provides temporary storage of at least some program code or data in order to reduce the number of times, code must be retrieved from external bulk storage 1116 for an execution. Elements inside the computer 1100 may be linked together by means of a bus system 1118 with corresponding adapters.

The computer system 1100 may also include input means, such as a keyboard 1108, a mouse 1110, or a microphone (not shown). Furthermore, the computer 1100, may include output means, such as a monitor 1112 [e.g., a liquid crystal display (LCD), a plasma display, a light emitting diode display (LED), or cathode ray tube (CRT) monitor]. The monitor may be driven by the graphical interaction system 1000, having a displaying unit 1002. The graphical interaction system 1000, the displaying unit 1002 and the monitor 1112 may be combined in one unit. The computer system 1100 may be connected to a network (e.g., a local area network (LAN), a wide area network (WAN), such as the Internet, or any other similar type of network, including wireless networks via a network interface connection 1114. This may allow a coupling to other computer systems. Those, skilled in the art will appreciate that many different types of computer systems exist, and the aforementioned input and output means may take other forms. Generally, the computer system 1100 may include at least the minimal processing, input and/or output means, necessary to practice embodiments of the invention.

Further, those, skilled in the art will appreciate that one or more elements of the aforementioned computer system 1100 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

It should also be noted that the term "comprising" does not exclude other elements or steps and "a" or "an" does not exclude a plurality. Also, elements described in association with different embodiments may be combined.

What is claimed is:

1. A method for creating a personalized content layout for a user interface, the method comprising:
    providing a content layout framework being a display template including a plurality of content fragments, wherein each content fragment is a single displayed component of the content layout framework;
    monitoring and storing usage data over time of each content fragment displayed in the content layout framework using a parameter model comprising a user ID denoting a user for whom the usage data is collected, a device ID denoting a device from which a content fragment is called, a context ID denoting a context in which the usage data is collected, a content title identifying contacts of the user, and a click history associating each user ID, device ID, context ID and content title; and changing a visual appearance of one content fragment in respect to its presentation within the content layout framework based upon an abrasion factor defined as a numerical value indicating the visual appearance of the one content fragment.

2. The method according to claim 1, wherein the visual appearance of the one content fragment changes from session to session of usage of the content layout framework, depending on a devolution of a first value of a first parameter of the parameter model, the linear function deployed to the first value of the first parameter of the parameter model, wherein the abrasion factor of the one content fragment is determined as a function of values of the parameter model and a device type including browser type and version that displays the content layout framework.

3. The method according to claim 1, wherein, in response to the one content fragment visually disappearing from the content layout framework, the one content fragment appears in a framework box for invisible fragments, wherein the one content fragment is restorable for appearing in the content layout framework.

4. The method according to claim 1, wherein the context ID comprises identifying usage data that occurs during work periods, during private non-work periods and during traveling periods.

5. The method according to claim 1, wherein a reset function resets all values of all parameters for an equal presentation weighting of all content fragments in the content layout framework.

6. The method according to claim 1, wherein backup copies of the parameter model values are stored in different versions depending on predefined time intervals.

7. The method according to claim 1, wherein the parameter model with respect to the one content fragment comprises a second parameter representing one out of the group comprising, time of usage, day in a week of usage, device used and location of usage.

8. The method according to claim 1, wherein the abrasion factor is determined from a linear function deployed to the first value of the first parameter of the parameter model, wherein the abrasion factor of the one content fragment is determined as a function of values of the parameter model.

9. The method according to claim 1, wherein the one content fragment is an icon displayed within the content layout framework.

10. A computer program product for creating a personalized content layout for a user interface, the computer program product comprising:
a computer-readable persistent storage medium having computer readable program code embodied therewith, the computer readable program code comprising:
computer readable program code configured to provide a content layout framework being a display template including a plurality of content fragments, wherein each content fragment is a single displayed component of the content layout framework;
computer readable program code configured to monitor and store usage data over time of each content fragment displayed in the content layout framework using a parameter model comprising a user ID denoting a user for whom the usage data is collected, a device ID denoting a device from which a content fragment is called, a context ID denoting a context in which the usage data is collected, a content title identifying contacts of the user, and a click history associating each user ID, device ID, context ID and content title;
computer readable program code configured to change a visual appearance of one content fragment in respect to its presentation within the content layout framework based on a first value of a first parameter of the parameter model, wherein the computer readable program code configured to change the visual appearance of the one content fragment based upon an abrasion factor defined as a numerical value indicating the visual appearance of the one content fragment, wherein an abrasion factor =1 means that the one content fragment is displayed without effects, an abrasion factor <1 means that the one content fragment is displayed with effects to cause less visibility, and an abrasion factor >1 means that the one content fragment is displayed with effects to cause higher visibility, said abrasion factor acting as an indicator of influence of the visual appearance of the one content fragment, such that a content fragment appearance changes from session to session of usage of the content layout framework, depending on a predefined function, deployed to the first value of the first parameter of the parameter model, and wherein the abrasion factor for changing the visual appearance of the one content fragment is calculated, without changing other content fragments, by an abrasion calculation component, wherein a calculation of the abrasion factor is a function of values of the parameter model and a device type including browser type and version that displays the content layout framework.

11. The computer program product of claim 10, wherein the predetermined function is a linear function, depending on a devolution of the first value of the first parameter of the parameter model.

12. The computer program product of claim 10, wherein, in response to the one content fragment visually disappearing from the content layout framework, the one content fragment appears in a framework box for invisible fragments, wherein the one content fragment is restorable for appearing in the content layout framework.

13. The computer program product of claim 10, wherein the context ID comprises identifying usage data that occurs during work periods, during private non-work periods and during traveling periods.

14. The computer program product of claim 10, further comprising computer readable program code configured to provide a reset function that resets all values of all parameters for an equal presentation weighting of all content fragments in the content layout framework.

15. The computer program product of claim 10, further comprising computer readable program code configured to store backup copies of the parameter model values in different versions depending on predefined time intervals.

16. The computer program product of claim 10, wherein the parameter model with respect to the one content fragment comprises a second parameter representing one out of the group comprising, time of usage, day in a week of usage, device used and location of usage.

17. The computer program product of claim 10, further comprising computer readable program code configured to provide a programming interface to the parameter model.

18. The computer program product of claim 10, wherein the one content fragment is an icon displayed within the content layout framework.

19. An apparatus, comprising:
a memory storing computer-readable program code; and a processor in communication with the memory to access the computer-readable program code, the processor executing the computer-readable program code to:

provide a content layout framework being a display template including a plurality of content fragments, wherein each content fragment is a single displayed component of the content layout framework, monitor and store in the memory usage data over time of each content fragment displayed in the content layout framework using a parameter model comprising a user ID denoting a user for whom the usage data is collected, a device ID denoting a device from which a content fragment is called, a context ID denoting a context in which the usage data is collected, a content title identifying contacts of the user, and a click history associating each user ID, device ID, context ID and content title, and change a visual appearance of one content fragment in respect to its presentation within the content layout framework based upon an abrasion factor defined as a numerical value indicating the visual appearance of the one content fragment, wherein an abrasion factor =1 means that the one content fragment is displayed without effects, an abrasion factor <1 means that the one content fragment is displayed with effects to cause less visibility, and an abrasion factor >1 means that the one content fragment is displayed with effects to cause higher visibility, wherein the processor uses the abrasion factor defined as an indicator of influence of the visual appearance of the one content fragment to determine the change of the visual appearance, such that the one content fragment appearance changes from session to session of usage of the content layout framework depending on a predefined function deployed to a first value of a first parameter of a parameter model, and wherein the abrasion factor for changing the visual appearance of the one content fragment is calculated, without changing other content fragments, by an abrasion calculation component, wherein a calculation of the abrasion factor is a function of values of the parameter model and a device type including browser type and version that displays the content layout framework.

20. The apparatus of claim 19, wherein the predetermined function is a linear function, depending on a devolution of the first value of the first parameter of the parameter model.

21. The apparatus of claim 19, wherein, in response to the one content fragment visually disappearing from the content layout framework, the one content fragment appears in a framework box for invisible fragments and is restorable to the content layout framework.

22. The apparatus of claim 19, wherein a reset function resets all values of all parameters for an equal presentation weighting of all content fragments in the content layout framework.

23. The apparatus of claim 19, wherein the context ID comprises identifying usage data that occurs during work periods, during private non-work periods and during traveling periods.

24. The apparatus of claim 19, wherein the parameter model with respect to the one content fragment comprises a second parameter representing one out of the group comprising, time of usage, day in a week of usage, device used and location of usage.

25. The apparatus of claim 19, wherein the one content fragment is an icon displayed within the content layout framework.

* * * * *